United States Patent Office 3,365,848
Patented Jan. 30, 1968

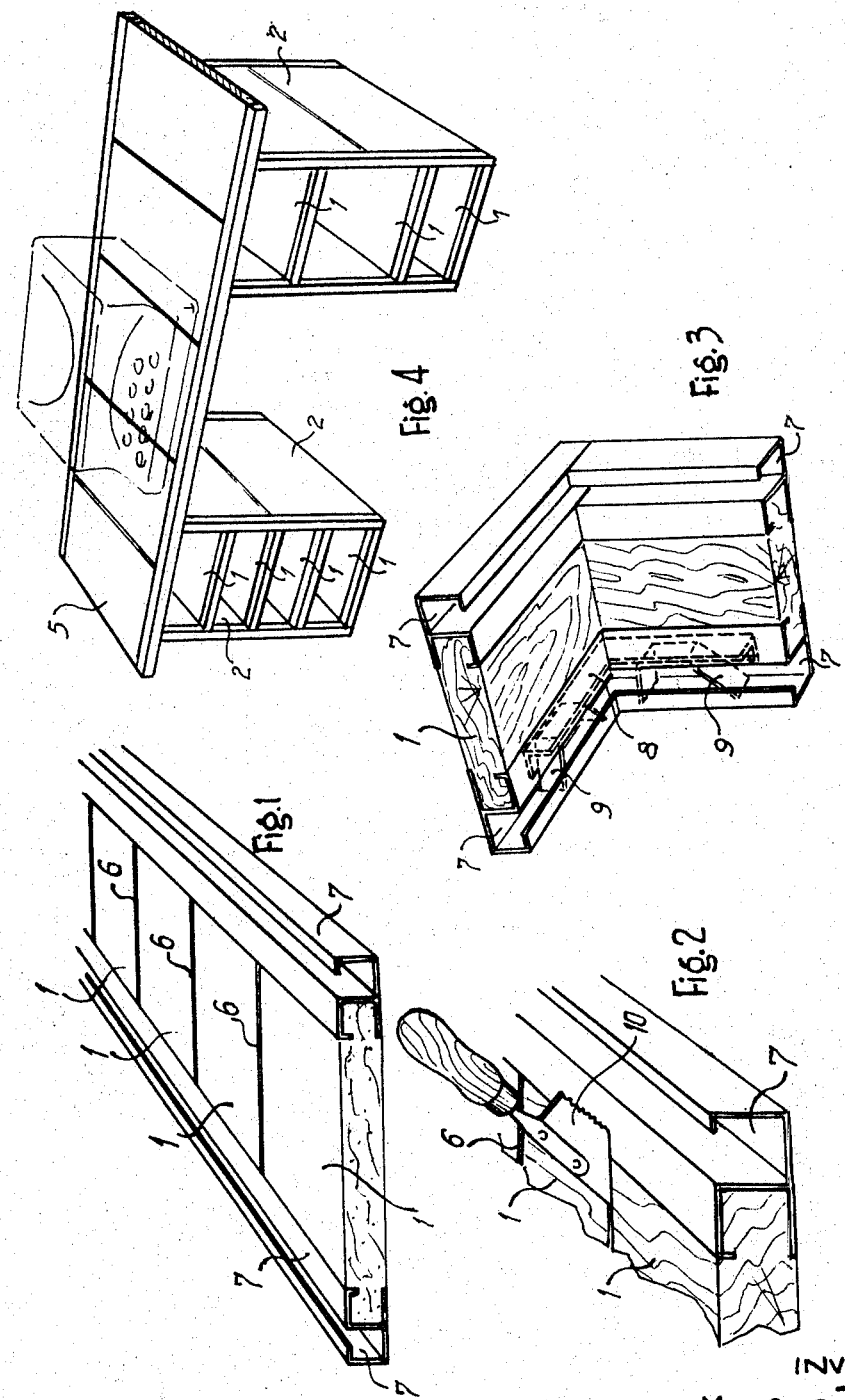

3,365,848
SECTIONABLE PANEL
Maurice Piget, 2 Rue Breuvery, Saint-Germain-en-Laye, France
Filed Jan. 11, 1965, Ser. No. 424,537
Claims priority, application France, Jan. 9, 1964, 959,899
2 Claims. (Cl. 52—105)

ABSTRACT OF THE DISCLOSURE

The present disclosure includes a drawing and description of a panel construction in which a series of transversely oriented filler planks extend between metal edge members and are separated by removal strips or lamella. The removable strips are of a width approximating the width of a saw blade so that the gap remaining after the removal of one of them serves as a guide for sawing the edge members, and thus the panels, to length.

The present invention relates to sectionable panels, prefabricated to a standard length from juxtaposed unit filler elements, made of wood, wood shavings or the like or plastic, and extending between edge members in the form of metal profile pieces, with interposition between said units of a lamella of the thickness of the edge of the blade of a saw, so that the length of a prefabricated panel can be sectioned up into multiples of the unit elements without having to saw the filler panel elements, by the simple removal of the lamella separating two unit elements, inserting a saw blade in the gap created by the removal of the lamella, and sawing the metal profile edge pieces.

Hitherto, the sectioning of prefabricated panels has been difficult to carry out, due to the absence of guiding for the blade of the saw, as both the filler panel and the two edge profile pieces have to be sectioned, the sectioned elements of the panel then being assembled orthogonally.

It is possible by means of the present invention, to direct with accuracy the guiding of the blade of the saw during the operation of the sectioning of the edges profile pieces.

For the manufacture of furniture, panels of various sizes are manufactured thus in particular and by way of example it is possible to make a panel constituted of five unit elements, standard size 330 mm., with the interposition between the elements of a lamella of the thickness 2 mm., and such a panel would be capable of being sectioned in six different ways, i.e.:

One panel (4 x 330+3 x 2)+one element 330 mm.
One panel (3 x 330+2 x 2)+one panel (2 x 330+2)
One panel (3 x 330+2 x 2)+two elements 330 mm.
Two panels (2 x 330+2)+one element 330 mm.
One panel (2 x 330+2)+three element 330 mm.
Five elements 330 mm.

It should be noted that in each standard size the panel will be carried out in different widths, so as to meet all requirements.

The invention will now be described with reference to the attached drawings, which are not intended to be restrictive.

FIGURE 1 is a perspective view of a panel mounting of two profiled pieces with two perpendicular inlets, constituted of four unit elements, with the interposition between elements of a lamella of thickness equal to that of the edge of the blade of a saw.

FIGURE 2 is a perspective view of the sectioning of the said panel, by the introduction of the blade of a saw into the gap between the two elements, with the lamella removed.

FIGURE 3 is a perspective view of the orthogonal assembly by angled members and support plates of two panels constituted of unit elements.

FIGURE 4 is a perspective view of a standard piece of furniture, i.e. an office desk constructed with four panels with five unit elements which have undergone various sectioning, using the assembly device shown in FIGURE 3.

As shown in the drawings, a plurality of plank-like unit elements 1 are assembled to provide a panel 2, the elements 1 of each panel being spaced from each other by a lamella 6 interposed therebetween. The lamella 6 is of a thickness equal to the width of the edge of a saw blade. The assembly of the unit elements 1 and lamella 6 is secured by profile pieces 7 each having two mutually perpendicular inlets. As shown in FIGS. 1 and 2 of the drawings, the profile piece inlets are undercut in the sense that they have a restricted width at their open side. This configuration enables the unit elements, which have a kerf spaced from their ends, to be secured in one of the inlets, leaving the other inlet open.

To secure an orthogonal assembly of two or more panels 2 in an article of furniture, such as a desk, angled members 8 of the type disclosed in my copending application Ser. No. 317,670, filed Oct. 21, 1963 now Patent No. 3,216,539, are used. Also as disclosed therein the members 8 are secured in the profile piece inlet not filled by the unit elements 1, by support plates 9.

As above mentioned, the thickness of the lamella 6 is the same as the edge width of a saw blade 10. Where it is desired therefore, to cut a panel to a length corresponding to the composite width of several juxtaposed unit elements 1, the lamella 6 at that point is removed and the saw 10 inserted into the gap remaining. With the saw blade guided by the edges of unit elements 1 on each side of the gap, accurate cutting of the profile pieces 7 is greatly facilitated.

By way of example there has been selected a panel constituted of five unit elements, 330 mm. long and 620 mm. wide i.e. the office desk of dimensions 1658 x 620 x 662 shown on FIGURE 4, making use of the following:

A panel with five elements for the table;
Four panels with two elements for the lateral walls;
Seven panels with one element for the shelves.

This has involved the use of four complete panels of five elements, one of which is not sectioned, two others of which are sectioned each in two panels with two elements, and a unit element, the fourth panel being sectioned in five unit elements.

I claim:
1. A prefabricated panel comprising: a pair of continuous edge pieces extending the length of the panel, a plurality of plank-like filler units disposed transversely of the panel and connected at their ends to said edge pieces; and a plurality of removable lamellae disposed one between each two of said filler units, said lamella having a thickness corresponding to the thickness of a standard saw blade whereby division of the panel into longitudinal sections corresponding in length to the width of one or more of said filler units may be effected by removing one of said lamellae, inserting a saw blade into the gap left by said lamella and sawing said edge pieces, using the gap as a saw guide.

2. The apparatus recited in claim 1 in which said edge pieces are metal profile pieces each having mutually perpendicular inlets along their length.

References Cited

UNITED STATES PATENTS

| 2,940,805 | 6/1960 | Nordman | 52—614 |
| 3,026,652 | 3/1962 | Helmerson | 52—105 |
| 3,216,539 | 11/1965 | Piget | 52—614 X |
| 3,219,383 | 11/1965 | Nerem | 52—627 X |
| 3,234,896 | 2/1966 | Bonsall | 312—195 X |
| 3,241,885 | 3/1966 | Deaton | 297—118 X |

FOREIGN PATENTS

| 771,434 | 4/1957 | Great Britain. |
| 323,254 | 9/1957 | Switzerland. |

HENRY C. SUTHERLAND, *Primary Examiner.*

FRANK L. ABBOTT, *Examiner.*

M. O. WARNECKE, *Assistant Examiner.*